United States Patent
Inoue (10) Patent No.: US 6,993,183 B2
(45) Date of Patent: Jan. 31, 2006

(54) IMAGE PROCESSING APPARATUS, IMAGE PROCESSING SYSTEM, IMAGE PROCESSING METHOD, AND COMPUTER-READABLE STORAGE MEDIUM

(75) Inventor: Hitoshi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/093,029

(22) Filed: Mar. 8, 2002

(65) Prior Publication Data

US 2002/0159633 A1   Oct. 31, 2002

(30) Foreign Application Priority Data

Mar. 13, 2001  (JP)  .............................. 2001-070711

(51) Int. Cl.
 *G06K 9/00*   (2006.01)

(52) U.S. Cl. ...................... 382/170; 382/171; 382/172; 382/190; 382/199; 382/264; 358/522; 358/518; 348/229.1; 345/596

(58) Field of Classification Search ................ 382/168, 382/169, 170, 171, 172, 173, 190, 199, 264, 382/266, 300; 358/518, 522, 302, 3.01, 3.03, 358/3.22, 3.23; 345/596, 690–697; 348/229.1, 348/362, 222.1
See application file for complete search history.

(56) References Cited

U.S. PATENT DOCUMENTS

| | | | |
|---|---|---|---|
| 5,133,020 A * | 7/1992 | Giger et al. ................. | 382/128 |
| 5,471,987 A | 12/1995 | Nakazawa et al. .......... | 128/659 |
| 6,665,432 B1 * | 12/2003 | Evans et al. ................. | 382/141 |
| 6,825,884 B1 * | 11/2004 | Horiuchi ...................... | 348/362 |
| 2002/0114015 A1 * | 8/2002 | Fujii et al. ................... | 358/302 |
| 2004/0170308 A1 * | 9/2004 | Belykh et al. .............. | 382/128 |
| 2004/0202361 A1 * | 10/2004 | Evans et al. ................. | 382/141 |

FOREIGN PATENT DOCUMENTS

| | | |
|---|---|---|
| EP | 0 546 600 A1 | 6/1993 |
| JP | 5-328357 | 12/1993 |
| JP | 6-292013 | 10/1994 |
| JP | 2000-244824 | 9/2000 |

* cited by examiner

*Primary Examiner*—Kanjibhai Patel
*Assistant Examiner*—Ali Bayat
(74) *Attorney, Agent, or Firm*—Fitzpatrick, Cella, Harper & Scinto (57) ABSTRACT

An image processing apparatus creates a pixel value histogram of an objective image, and approximates a predetermined range of the created histogram by a bended line formed from two straight lines. Then the apparatus extracts a pixel value at a boundary between a predetermined region and another region of the objective image in accordance with the approximation.

23 Claims, 11 Drawing Sheets

IMAGE PROCESSING APPARATUS, IMAGE PROCESSING SYSTEM, IMAGE PROCESSING METHOD, AND COMPUTER-READABLE STORAGE MEDIUM

BACKGROUND OF THE INVENTION

1. Field of the Invention

The present invention relates to an image processing apparatus, an image processing system, an image processing method, and a computer-readable storage medium which stores a program for causing a computer to realize functions of the apparatus and the system or to perform operations of the method. This image processing targets a radiograph of an object (imaged transmission amount of radiation having passed through the interior of the object) acquired by radiographing such as X-raying in the medical field.

2. Related Background Art

The interior of an object, particularly a human body has been observed by observing an X-ray amount transmission distribution via the object when the object is exposed to X-rays. In recent years, an X-ray distribution (image of which will be called an "X-ray image") having passed through an object is generally acquired by a large-size image sensor using a solid-state image sensing element called a "flat panel X-ray sensor".

One of the advantages of the solid-state image sensing element is to directly spatially sample a two-dimensional energy distribution (X-ray amount transmission distribution) by a plurality of receiving pixels present on a sensor surface, and convert the distribution into a signal.

As a disadvantage of the solid-state image sensing element, a plurality of pixel elements for spatially sampling an X-ray amount transmission distribution are basically independent elements having different characteristics. Acquiring an appropriate image (X-ray image) as if it was output from an ideal solid-state image sensing element made up of pixels having uniform characteristics requires image processing for correcting characteristic variations between pixels.

For example, when the pixel element is an energy conversion element having a linear characteristic, main characteristic variations are variations in conversion efficiency (gain) and offset. Hence, the gain and offset must be first corrected when the X-ray image of an object is to be obtained by an image sensor using a solid-state image sensing element.

As a method of correcting offset variations (to be also simply referred to as "offset correction" hereinafter), the unique offset value of each pixel attained without supplying X-ray energy to an image sensor is acquired. The offset value is subtracted from image information which contains an object image and is obtained by irradiating the image sensor with X-rays via the object. This method also allows setting an offset value acquisition time (e.g., energy accumulation time in the image sensor) in accordance with an actual X-ray image acquisition time.

As a method of correcting gain variations (to be also simply referred to as "gain correction" hereinafter), a so-called "white image" is acquired by supplying X-ray energy to an image sensor without any object. After the above-described offset variation correction is performed, gain correction is executed for each pixel by division using the white image. In most cases, gain correction is realized by the pixel value difference between pixels after logarithmic transformation.

The feature of an image sensor in acquiring an X-ray image is a very wide dynamic range of the X-ray amount received by the image sensor because of the following reason. To accurately draw information about the interior of an object, the X-ray amount irradiating the object is so adjusted as to make the dynamic range of an X-ray amount transmission distribution via the object coincide with the dynamic range of the image sensor. Then, an X-ray amount at a region (to be referred to as a "through region" hereinafter) where X-rays do not pass through the object increases and directly reaches the image sensor.

Direct incidence of too strong X-rays saturates an output value in an image sensor, i.e., an image sensor using a solid-state image sensing element. Such saturation occurs when the incident X-ray amount exceeds the charge allowable amount of a pixel on the X-ray image sensor, when an electrical amplifier on the output stage saturates, or when an A/D conversion system for digitizing an electric amount saturates. In any case, an obtained output value is fixed to an almost constant invariant value.

If offset correction or gain correction is done in this saturated state while correction data acquired in an unsaturated state is used as data used for each correction, variations between pixels to be corrected are conversely superposed on an image (e.g., through region), generating noise.

To solve this problem, e.g., Japanese Patent Application Laid-Open No. 2000-244824 proposes an arrangement in which a gain control amplifier adjusts a signal so as to always process its maximum value at any X-ray amount.

This arrangement, however, performs adjustment which accurately images even a direct ray region (through region on which X-rays are directly incident) having no information. This decreases the contract resolving power of a necessary object region.

Especially in an X-ray image, the dynamic range of image information is compressed to display and output the image information in order to make the details of the X-ray image clear. In this case, even a direct ray region containing many noise components is emphasized and output.

To solve this problem, e.g., Japanese Patent Application Laid-Open No. 6-292013 proposes an arrangement which decreases the emphasis degree of a direct ray region in compressing the dynamic range of image information. This proposal, however, does not specify a means for accurately extracting a direct ray region. Erroneous recognition of a pixel value which constitutes the direct ray region may degrade the contrast of an image diagnostic X-ray image.

Further, e.g., Japanese Patent Application Laid-Open No. 5-328357 proposes an arrangement which analyzes the peak value of a histogram obtained from an objective X-ray image to decide the dynamic range of the X-ray image. However, this arrangement may cause a large error in grasping an accurate pixel value of a direct ray region because only the peak value of the X-ray image histogram is analyzed.

SUMMARY OF THE INVENTION

The present invention has been made to overcome the conventional drawbacks, and has as its object to provide an image processing apparatus, image processing system, and image processing method capable of accurately extracting a pixel value at a boundary between a predetermined region and another region of an objective image, and a computer-readable storage medium which stores a program for causing a computer to realize functions of the apparatus and the system or to perform operations of the method.

It is another object of the present invention to provide an image processing apparatus, image processing system, and image processing method capable of accurately recognizing a pixel value of a predetermined region such as a direct ray region (through region) on an objective radiograph and substantially fixing the pixel value of the predetermined region to a predetermined value, thereby providing a high-quality radiograph, and a computer-readable storage medium which stores a program for causing a computer to realize functions of the apparatus and the system or to perform operations of the method.

According to the present invention, the foregoing object is attained by providing an image processing apparatus comprising:

a histogram creation unit for creating a pixel value histogram of an objective image; and an extraction unit for extracting a pixel value at a boundary between a predetermined region and another region of the objective image by approximating by a bended line formed from two straight lines a predetermined range of the histogram created by the histogram creation unit.

According to the present invention, the foregoing object is also attained by providing an image processing method comprising steps of:

creating a pixel value histogram of an objective image; and extracting a pixel value at a boundary between a predetermined region and another region of the objective image by approximating by a bended line formed from two straight lines a predetermined range of the histogram created in the step of creating the histogram.

Other objects, features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

A preferred embodiment of the present invention will be described in detail in accordance with the accompanying drawings.

[First Embodiment]

Figure 1:
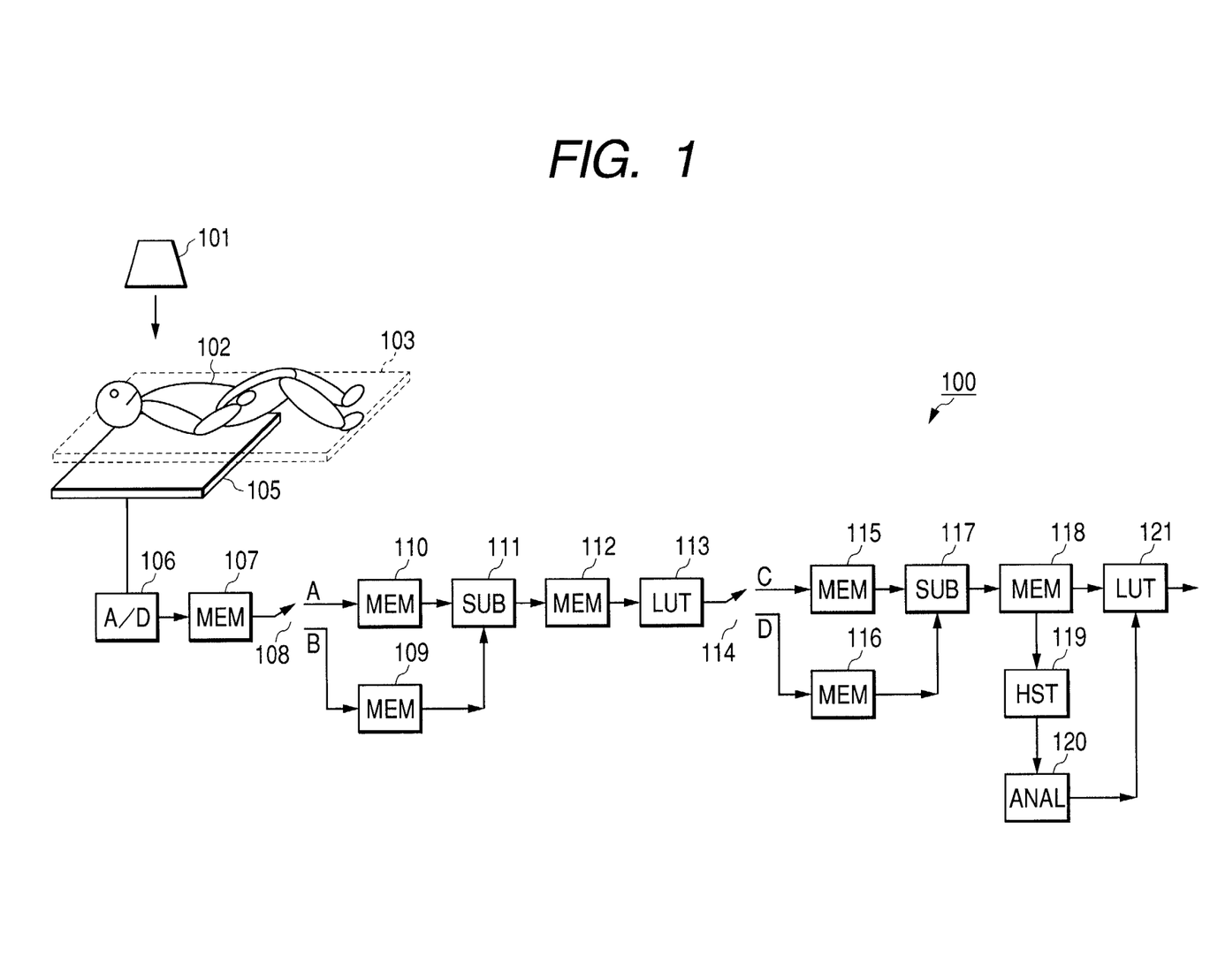
FIG. 1 is a block diagram showing the arrangement of an X-raying apparatus to which the present invention is applied.

The present invention is applied to, e.g., an X-raying apparatus 100 as shown in FIG. 1.

The X-raying apparatus or radiographic apparatus 100 of the first embodiment accurately, stably extracts the start pixel value (minimum pixel value) of a direct ray region (through region where X-rays directly enter an image sensor without the mediacy of an object) on an X-ray image from histogram information of the X-ray image. In addition, the X-raying apparatus 100 substantially fixes the extracted pixel value of the direct ray region to a predetermined value by a pixel value transform process in order to suppress pixel value variations in the direct ray region (e.g., noise by image correction).

The X-raying apparatus 100 of the first embodiment will be described in detail below.

<Overall Arrangement and Operation of X-raying Apparatus 100>

As shown in FIG. 1, the X-raying apparatus 100 comprises an X-ray generator 101, a bed 103, an X-ray image sensor 105, an A/D converter 106, a memory (MEM) 107, a switch 108, memories 109 and 110, a difference block (SUB) 111, a memory (MEM) 112, a lookup table (to be also referred to as an "LUT" hereinafter) 113, a switch 114, memories 115 and 116, a difference block (SUB) 117, a memory (MEM) 118, a histogram creation unit (HST) 119, an arithmetic block (ANAL) 120, and an LUT 121.

The X-ray generator 101 emits X-rays (see an arrow in FIG. 1) to an object 102 on the bed 103 under the control of a controller (not shown) accompanied with generation of high voltage. An example of the object 102 is a human body laid on the bed 103.

The X-ray image sensor 105 converts the intensity distribution of the amount of X-rays having passed through the object 102 into an electrical signal. The X-ray image sensor 105 includes a large-size solid-state image sensing element.

More specifically, the X-ray image sensor (to be also referred to as a "flat panel sensor" hereinafter) 105 spatially samples an X-ray amount transmission distribution on a two-dimensional plane by using a plurality of pixels two-dimensionally arrayed in a matrix. When the object 102 is a human body, the sampling pitch is generally set to about 100 $\mu$m to 200 $\mu$m.

The flat panel sensor 105 converts a charge value proportional to an X-ray amount present for each pixel into an electrical amount (image signal) serving as a voltage or current under the control of the controller (not shown). The image signal obtained by the flat panel sensor 105 is output to the subsequent A/D converter 106 by sequential scanning.

The A/D converter 106 digitizes the image signal output from the flat panel sensor 105, and outputs the digital signal.

The memory 107 temporarily stores the output from the A/D converter 106 as image data.

The switch 108 reads out image data from the memory 107, and selectively stores the readout image data in either of the two memories 109 and 110.

The memory 109 stores, as offset-fixed pattern image data, image data which is output from the flat panel sensor 105 via the A/D converter 106 and memory 107 while the object 102 is not exposed to X-rays. The memory 110 stores, as picked up image data, image data which is output from the flat panel sensor 105 via the A/D converter 106 and memory 107 while the object 102 is actually exposed to X-rays (actual imaging state).

More specifically, an X-ray amount measurement device (not shown) for monitoring an X-ray amount having passed through the object 102 is used as an X-ray exposure control sensor called a "phototimer". X-ray exposure by the X-ray generator 101 stops as soon as the accumulated value (charge amount) of an X-ray amount emitted by the X-ray generator 101 reaches a predetermined value. At the same time, the flat panel sensor 105 is scanned to store image data of the object 102 in the memory 107. The output of the switch 108 is switched to a terminal A, and the image data in the memory 107 is output as picked up image data to the memory 110.

Immediately afterward, the flat panel sensor 105 is driven without any X-ray exposure by the X-ray generator 101 until the accumulation time reaches the exposure time attained by the phototimer.

After charge accumulation in the flat panel sensor 105 ends, the flat panel sensor 105 is scanned to store image data obtained without any X-ray exposure in the memory 107. The output of the switch 108 is switched to a terminal B, and the image data in the memory 107 is output as offset-fixed pattern image data to the memory 109.

The difference block 111 performs processing of subtracting pixel data present at a given position out of pixel data constituting the offset-fixed pattern image data stored in the memory 109 from corresponding pixel data constituting the picked up image data stored in the memory 110. The difference block 111 stores the result in the memory 112.

The LUT 113 is a logarithmic transformation lookup table used to achieve gain correction (to be described later) using subtraction. The obtained image data (image data containing an object image) in the memory 112 is output via the LUT 113.

The output of the switch 114 is switched to terminal C, and the image data from the LUT 113 is output to the memory 115.

The memory 116 stores image data acquired when an operation called "calibration" is done in the X-raying apparatus 100.

In calibration, image data is acquired by the above-described imaging operation without any object 102. The output of the switch 114 is switched to a terminal D, and the image data from the LUT 113 is output to the memory 116. The image data in the memory 116 is made up of an X-ray amount distribution obtained without any object 102, and data containing only gain variations between pixels.

In general, calibration operation is done once a day at the start of work. Gain variations between the pixels of the flat panel sensor 105 can be corrected by data (image data in the memory 116) attained by calibration.

The difference block 117 subtracts image data (gain image data) in the memory 116 from image data (original image data) in the memory 115, thus correcting gain variations between pixels on the original image. The corrected image data is stored in the memory 118.

The histogram creation unit 119 reads out the image data (corrected image data) stored in the memory 118, and creates the histogram of the image.

The arithmetic block 120 analyzes the histogram created by the histogram creation unit 119, and detects a heel point.

Figure 2:
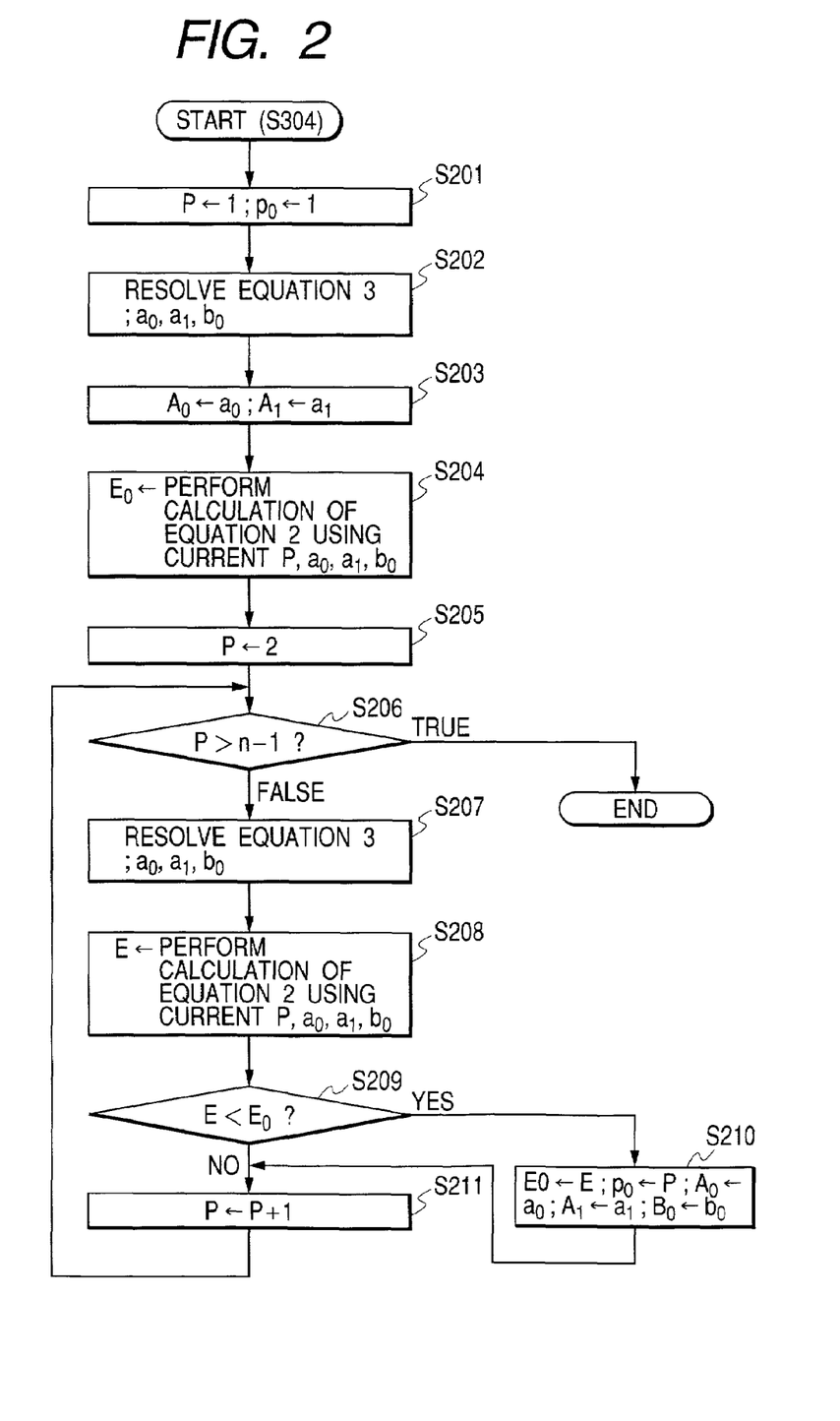
FIG. 2 is a flowchart for explaining bended line fitting processing executed by an arithmetic block 120 of the X-raying apparatus.
Figure 3:
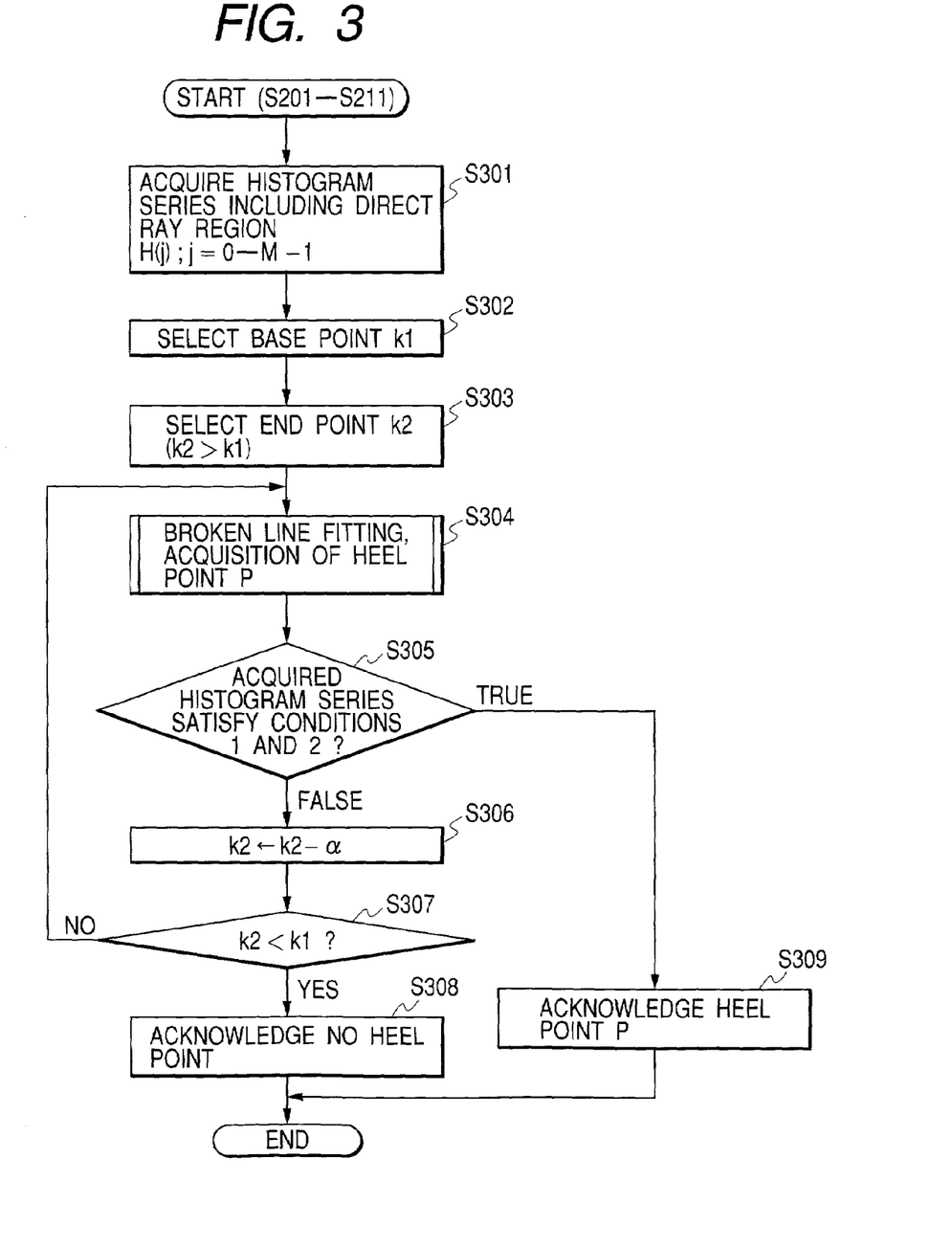
FIG. 3 is a flowchart for explaining heel point detection processing including bended line fitting processing.

For example, the arithmetic block 120 executes processing whose details comply with the flowcharts of FIGS. 2 and 3.

In processing shown in FIG. 3, a base point k1 used to extract the start pixel value (heel point) of a direct ray region is selected from the histogram of an image to be processed, i.e., a histogram including the direct ray region (region where X-rays directly enter the flat panel sensor 105) (step S302). At this time, a value which is almost the maximum value of image data of the object 102 is selected as the base point k1 on the basis of a ratio empirically attained from the maximum pixel value or a specific pixel value. As an end point k2 for the base point k1, the maximum value of image data is selected.

By selecting the base point k1 and end point k2 in this manner, an appropriate heel point can be obtained without any decisive influence on heel point detection in a subsequent processing step.

Figure 4:
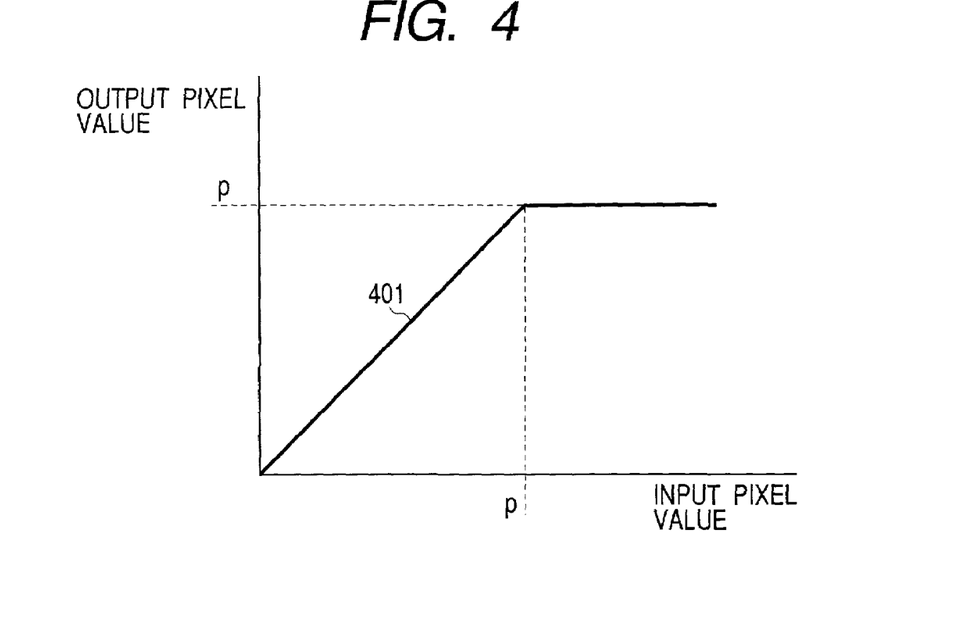
FIG. 4 is a graph for explaining the structure of an LUT used in the X-raying apparatus.

The LUT 121 is a lookup table as shown in FIG. 4 that is generated on the basis of a heel point (histogram heel point P in the direct ray region) obtained by the arithmetic block 120. In FIG. 4, the abscissa represents an input pixel value; and the ordinate, an output pixel value. As represented by "401" in FIG. 4, the LUT 121 outputs an input pixel value as an output pixel value when the input pixel value is smaller than a pixel value p (value of the heel point P). The LUT 121 outputs a fixed value p as an output pixel value when the input pixel value is equal to or larger than the pixel value p. Accordingly, density variations in the direct ray region which greatly varies are suppressed and fixed to the fixed value p.

Image data output from the LUT 121 is displayed on, e.g., a display (not shown) for image diagnosis.

<Characteristic Arrangement of X-raying Apparatus 100>

As the most characteristic arrangement of the first embodiment, the arithmetic block 120 accurately, stably extracts a direct ray region from an objective image. Pixel value variations (e.g., noise by image correction) in the direct ray region are suppressed. The pixel value of the direct ray region is fixed to an almost constant value by a pixel value transform process. In extracting the direct ray region, the arithmetic block 120 accurately, stably extracts a pixel value (start pixel value) at which the direct ray region starts.

This arrangement will be explained in detail.

Figure 5:
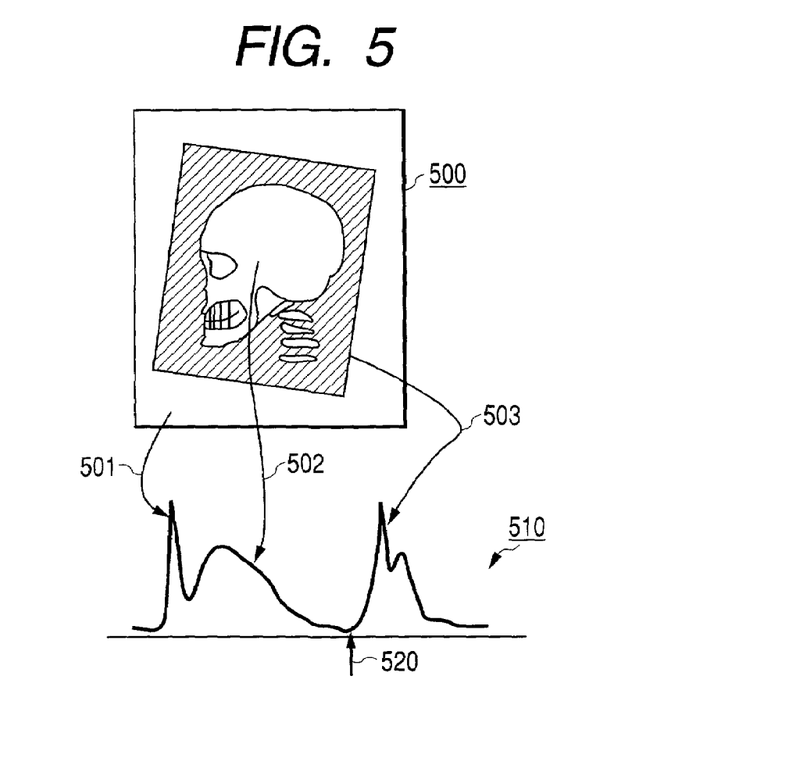
FIG. 5 is a view for explaining an example of an image to be processed in the X-raying apparatus and the histogram of the image.

FIG. 5 shows an image (objective image) 500 as an example of an image to be processed (picked up image of the object 102 stored in the memory 118), and a histogram 510 of the objective image 500 created by the histogram creation unit 119.

In FIG. 5, "501" denotes a region where no X-rays are incident, and its histogram portion (to be also referred to as a "histogram 501H" hereinafter); "502", an object region and its histogram portion (to be also referred to as a "histogram 502H" hereinafter); and "503", a direct ray region outside the object region and its histogram portion (to be also referred to as a "histogram 503H" hereinafter).

The general feature of the direct ray region 503 is that the X-ray intensity is very high without any abrupt decrease in X-ray intensity by an object (in this case, "human body"), and that the histogram 503H exists at a position having a large difference from a pixel value within the object region 502.

The direct ray region 503 generally seems to be easily separated. However, the boundary between the object region (human body region) 502 and the direct ray region 503, i.e., pixel information about a region such as a skin or ear is very difficult to separate.

A pixel value indicated by an up arrow "520" in FIG. 5 is a pixel value (to be also referred to as a "boundary value 520" hereinafter) at the boundary between the object region 502 and the direct ray region 503. If a pixel value equal to or higher than the boundary value 520 is fixed, pixel value variations, i.e., noise in the direct ray region 503 can be eliminated. An image can stand an operation such as dynamic range compression.

However, even slight variations in the boundary value 520 cause a problem such that a region such as a skin or ear in the object region 502 is not drawn or noise in the direct ray region 503 remains.

The boundary value 520 is heuristically, relatively stably calculated by human determination so long as the histogram 510 is graphed and properly displayed. However, the boundary value 520 is relatively difficult to stably, automatically determine by a computer.

In the first embodiment, the arithmetic block 120 accurately, stably extracts the boundary value 520, i.e., the start pixel value of the direct ray region 503 by the following simple method.

Figure 6:
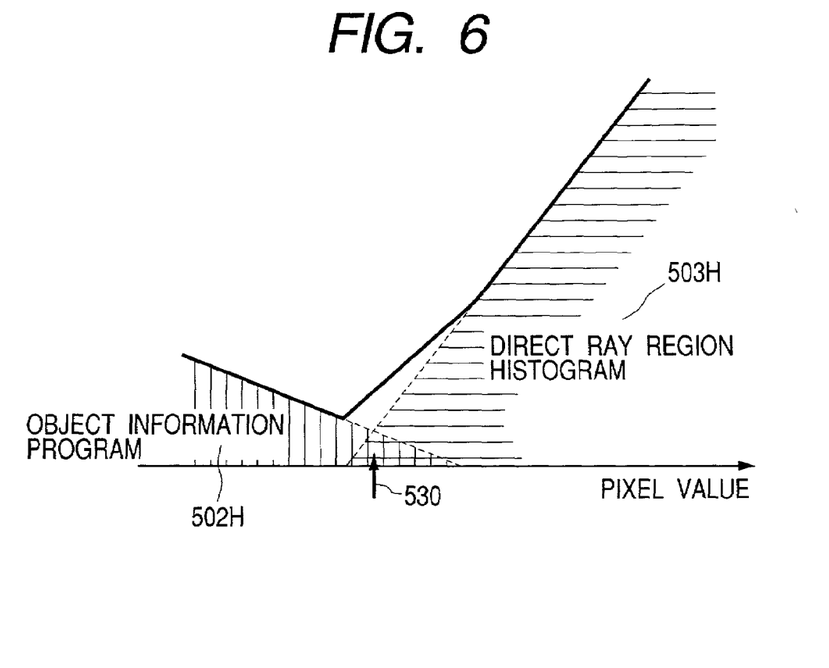
FIG. 6 is a graph for explaining processing of modeling the direct ray region of the histogram.

FIG. 6 is an enlarged view showing the vicinity of the boundary between the histogram 502H of the object region 502 and the histogram 503H of the direct ray region 503 on the histogram 510 shown in FIG. 5.

The arithmetic block 120 performs modeling such that the frequency of the pixel value of a small region such as a skin linearly decreases on the histogram 502H of the object region 502 and the frequency linearly increases on the histogram 503H of the direct ray region 503. An arrow "530" in FIG. 6 indicates a point which optimally separates the histograms 502H and 503H.

Figure 7:
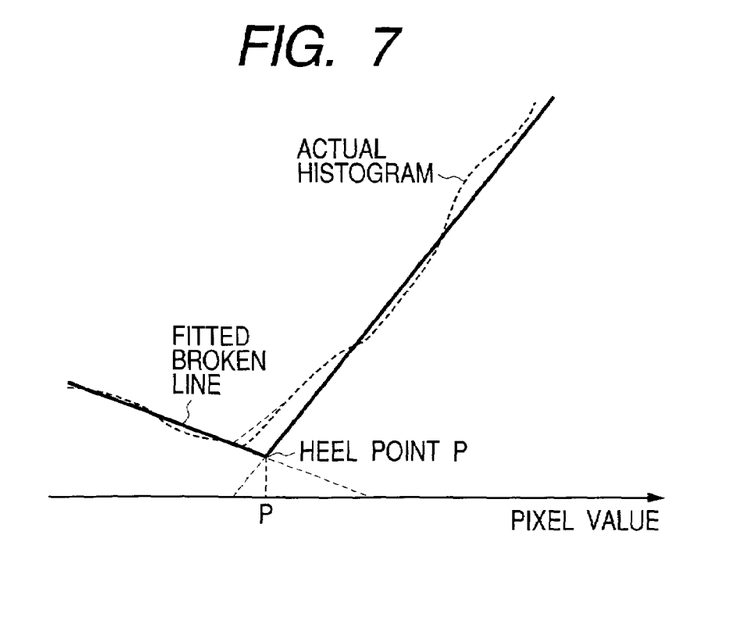
FIG. 7 is a graph for explaining the bended line fitting in detail.

To obtain the optimal separation point 530 based on modeling, the boundary between the object region 502 and the direct ray region 503 is optimally approximated by a bended line, as shown in FIG. 7. A heel point P is extracted as the optimal separation point 530, i.e., heel point. As a result, an optimal, stable heel point can be extracted.

Histogram analysis is a conventional method but mainly analyzes a peak or the degree of concentration. There is no method of extracting a heel point by the arrangement of the first embodiment.

Figure 8:
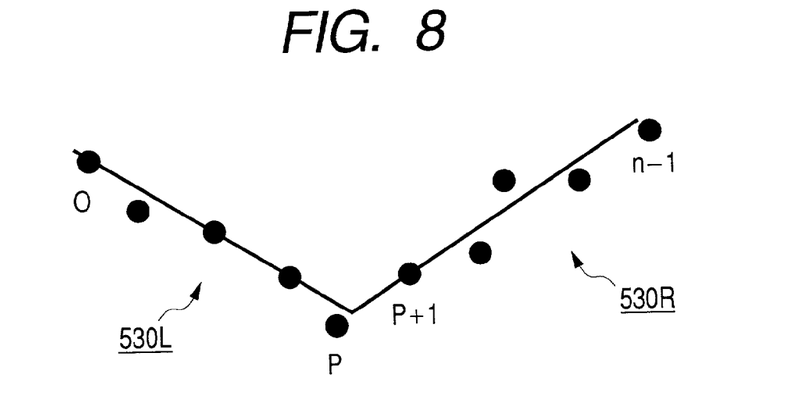
FIG. 8 is a view for explaining arithmetic processing in the bended line fitting in detail.

FIG. 8 is a view for explaining approximation by the bended line shown in FIG. 7.

In FIG. 8, ● are n histogram points 0 to n−1 on an objective image (digital image). As shown in FIG. 8, the bended line is broken at the heel point P. Letting "x" be the abscissa and "y" be the ordinate, the bended line made up of two straight lines: a straight line 530L from 0 to P and a straight line 530R from P to (n−1) is expressed by $$\begin{cases} y = a0x + b0; \ 0 \leq x \leq P \\ y = a0P + a1(x-P) + b0; \ P \leq x \leq n-1 \end{cases} \quad (1)$$

Note that the "P" value represents the index of the heel point P.

In equation (1), parameters a0, a1, and b0 can be calculated by linear algebra in accordance with the least-squares method if the heel point P is fixed.

The parameter a0 represents the slope of the straight line 530L (left straight line), and the parameter a1 represents the slope of the straight line 530R (right straight line).

Letting [(xi,yi);i=0 to n−1] be the n histogram points shown in FIG. 8, the sum $\epsilon$ of mean square errors is given by $$\epsilon = \sum_{i=0}^{P}(a0xi + b0 - yi)^2 + \sum_{i=P}^{n-1}(a0P + a1(xi-P) + b0 - yi)^2 \quad (2)$$

To minimum the sum $\epsilon$ of mean square errors, simultaneous equations which transform the partial differentials of the parameters a0, a1, and b0 to "0":

$$\begin{bmatrix} \left(\sum_{i=0}^{P} xi^2 + \sum_{i=P}^{n-1} P^2\right) & \sum_{i=P}^{n-1}(xi-P)P & \left(\sum_{i=P}^{n-1} P + \sum_{i=0}^{P} xi\right) \\ \sum_{i=P}^{n-1}(xi-P)P & \sum_{i=P}^{n-1}(xi-P)^2 & \sum_{i=P}^{n-1}(xi-P) \\ \left(\sum_{i=0}^{n-1} P + \sum_{i=0}^{P} xi\right) & \sum_{i=P}^{n-1}(xi-P)(n+1) & \end{bmatrix} \quad (3)$$

$$\begin{bmatrix} a0 \\ a1 \\ b0 \end{bmatrix} = \begin{bmatrix} \sum_{i=0}^{P} yixi + \sum_{i=P}^{n-1} yiP \\ \sum_{i=P}^{n-1} yi(xi-P) \\ \sum_{i=P}^{n-1} yi + yp \end{bmatrix}$$

are solved.

In the above-described arithmetic processing, the heel point P is treated as a known value. In practice, the heel point P is unknown. Thus, the heel point P which minimizes the calculation result (sum $\epsilon$ of mean square errors) of equation (2) is calculated by executing calculation of equation (2) while changing the value of the heel point P.

FIG. 2 shows this arithmetic processing.

A bended line is obtained by substituting P, a0, a1, and b0 in equation (1) with p0, A0, A1, and B0 as the results of processing in FIG. 2.

First, an initial value "1" is set as the indices P and p0 of a bended line (step S201). With these values, arithmetic processing of equations (3) is executed (step S202). Resultant parameters a0 and a1 are set as the parameters A0 and A1 (step S203).

Arithmetic processing of equation (2) is executed using the current index P and parameters a0, a1, and b0 (step S204).

"2" is set as the index P (step S205), and whether the value of the index P exceeds (n−1) is checked (step S206).

If TRUE in step S206, i.e., all the n histogram points have undergone processing, the processing ends.

If FALSE in step S206, arithmetic processing of equations (3) is executed using the current index P and parameters a0, a1, and b0 (step S207). Then, arithmetic processing of equation (2) is executed (step S208).

The result (sum ε of mean square errors) of arithmetic processing of equation (2) is set as "E". Whether the resultant value E is smaller than the previous processing result E0 is checked (step S209).

If Yes in step S209, the current values E, P, a0, a1, and b0 are set as E0, p0, A0, A1, and B0 (step S210).

After that, the index P is counted up (step S211), and processing is executed from step S206 again.

If No in step S209, processing in step S211 is directly executed. Then, processing is executed from step S206 again.

In the first embodiment, bended line approximation (fitting) as described above is done while partial data is selected from a histogram (histogram data series) which is created by the histogram creation unit 119 and includes a direct ray region. When the selected partial data satisfies conditions (1) and (2):

$$\frac{a1 - a0}{|a0|} > T(>0):\qquad \text{Condition (1)}$$

The slope abruptly rises via the heel point.
Inverted L shape $$\frac{\sqrt{n\varepsilon}}{\sum_{i=0}^{n-1} yi} < \delta 0:\qquad \text{Condition (2)}$$

The ratio of the standard deviation to the average value is small. (Satisfactory fitting is accomplished.) the heel point P is extracted. This enables stably extracting the heel point P.

In conditions (1) and (2), for example, the "T" value can be a numerical value around 50%, and the "δ0" value can be a numerical value around 10%. In this case, a heel point is extracted when the change rates of the slopes of two straight lines which form a bended line are 50% or more and the ratio of errors to bended line fitting results is 10% or less.

The heel point P is extracted in this fashion because an accurate heel point as the start point of a direct ray region cannot be attained unless a histogram data series used to extract the heel point P is properly selected.

Figure 9:
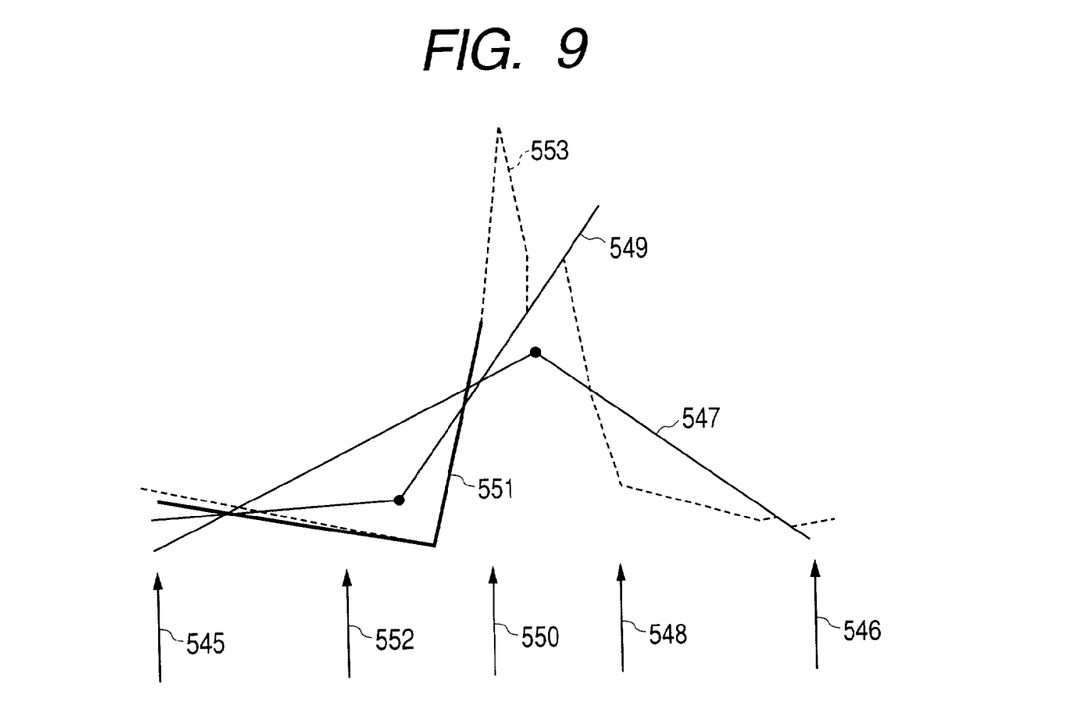
FIG. 9 is a view for explaining the heel point detection processing in detail.

This will be explained in detail with reference to FIG. 9. In FIG. 9, "553" denotes a histogram including a direct ray region.

On the histogram 553, a point 545 apparently not falling within the direct ray region is set as a base point.

The objective data range is defined from the point 545 to a point 546 via points 552, 550, and 548. An optimum bended line as shown in FIG. 8 is represented by "547" in FIG. 9. However, the bended line 547 does not meet either condition (1) or (2).

The use of a data series of the points 545, 552, 550, and 548 provides a bended line "549" in FIG. 9. The bended line 549 may meet condition (1), but whether satisfactory fitting in condition (2) is achieved is uncertain.

The use of a data series of the base point 545 and point 552 realizes satisfactory fitting, thus meeting condition (2). However, the "inverted L shape" in condition (1) is not obtained.

The use of a data series of the point 545 and points 552 and 550 provides a bended line 551 in FIG. 9. The bended line 551 meets both conditions (1) and (2). Hence, the heel point of the obtained bended line 551 can be set as the heel point of the histogram.

FIG. 3 is a flowchart showing this heel point extraction processing.

The histogram creation unit 119 creates the histogram of an objective image (step S301).

The arithmetic block 120 extracts a heel point P by executing processing from step S302 on the basis of the histogram created by the histogram creation unit 119.

The arithmetic block 120 sets as a base point k1 a point which sufficiently includes a direct ray region on the histogram created by the histogram creation unit 119 (step S302). The base point k1 is attained empirically or by a simple histogram analysis method or the like.

The arithmetic block 120 selects an end point k2 from the histogram (step S303). The end point k2 can be a point having the maximum value of the pixel value on the histogram.

The arithmetic block 120 performs bended line fitting by processing shown in FIG. 2 using a data series from the base point k1 to the end point k2, thereby attaining a heel point P (step S304).

On the basis of the fitting result in step S304, the arithmetic block 120 checks whether the data series simultaneously satisfies conditions (1) and (2) (step S305).

If FALSE in step S305, the arithmetic block 120 updates the end point k2, i.e., the data series in order to perform fitting with a shorter data series (step S306). In this case, the data series is shortened by subtracting a value "α" from the value (index) of the end point k2. The value "α" may be, e.g., "1", but suffices to be a proper numerical value "10" in order to increase the arithmetic efficiency.

The arithmetic block 120 checks whether the value of the updated end point k2 in step S306 is smaller than the base point k1 (step S307).

If Yes in step S307, i.e., the value of the end point k2 is improper, the arithmetic block 120 determines that no heel point exists because the current data series does not include a direct ray region having a sufficiently large area. Then, the arithmetic block 120 ends the processing.

If No in step S307, the arithmetic block 120 executes processing from step S304 again.

If TRUE in step S305, the arithmetic block 120 sets the current broken point P as the heel point P (step S309), and ends the processing.

[Second Embodiment]

Figure 10:
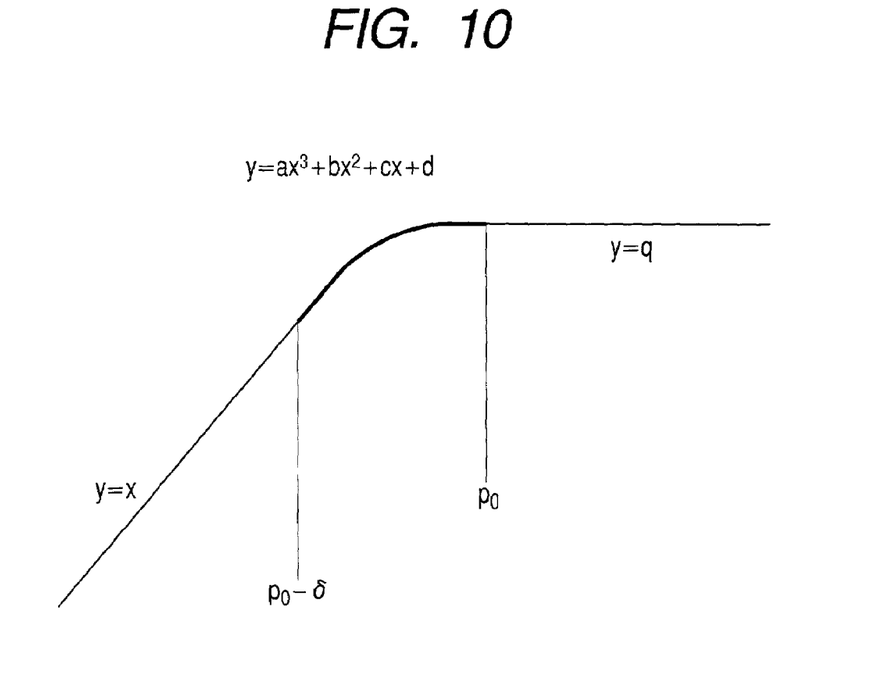
FIG. 10 is a graph for explaining the structure of an LUT used in an X-raying apparatus according to the second embodiment.

In the second embodiment, the LUT 121 in the X-raying apparatus 100 of FIG. 1 is changed into, e.g., a lookup table as shown in FIG. 10.

In other words, in the second embodiment, the graph line is not broken at the heel point P with an angle, as shown in FIG. 4. An LUT 121 is formed using a cubic function ($y = ax^3 + bx^2 + cx + d$) as shown in FIG. 10 in order to successively connect a clipped output pixel value (fixed value p) and an unclipped output pixel value (pixel value equal to an input pixel value).

In FIG. 10, "p0" is a heel point P, but may slightly shift from the heel point P by a predetermined value. "q" is an output-clipped value and can be an arbitrary value equal to or larger by a predetermined value than the heel point P. "δ" defines the range within which the LUT 121 is curved.

The cubic function in the second embodiment is the solution of simultaneous equations (4):

$$\begin{bmatrix} (p0-\delta)^3 & (p0-\delta)^2 & (p0-\delta) & 1 \\ p0^3 & p0^2 & p0 & 1 \\ 3(p0-\delta)^2 & 2(p0-\delta) & 1 & 0 \\ 3p0^2 & 2bP & 1 & 0 \end{bmatrix} \begin{bmatrix} a \\ b \\ c \\ d \end{bmatrix} = \begin{bmatrix} (p0-\delta) \\ q \\ 1 \\ 0 \end{bmatrix} \quad (4)$$

as far as values and differentiated values are equal to each other at respective nodes.

The solution of simultaneous equations (4) can be actually calculated. Parameters a to d are given by $$\begin{cases} a = \dfrac{2p0 - \delta - 2q}{\delta^3} \\ b = -\delta \dfrac{6p0^2 - 6p0\delta + 2\delta^2 - 6qp0 + 3q\delta}{\delta^3} \\ c = \dfrac{p0(6p0^2 - 9p0\delta + 4\delta^2 - 6qp0 + 6q\delta)}{\delta^3} \\ d = -\dfrac{(p0-\delta)^2(2p0^2 - 2qp0 - q\delta)}{\delta^3} \end{cases} \quad (5)$$

Since the LUT 121 is formed from a continuous, differentiable curve, as described above, the second embodiment can provide a stably processed image.

[Third Embodiment]

In the second embodiment, the LUT 121 is formed from a continuous, differentiable curve. The curved (nonlinear) portion of the LUT 121 may contain noise information of an object region and direct ray region.

The third embodiment decreases such noise information to realize more natural clipping.

Figure 11:
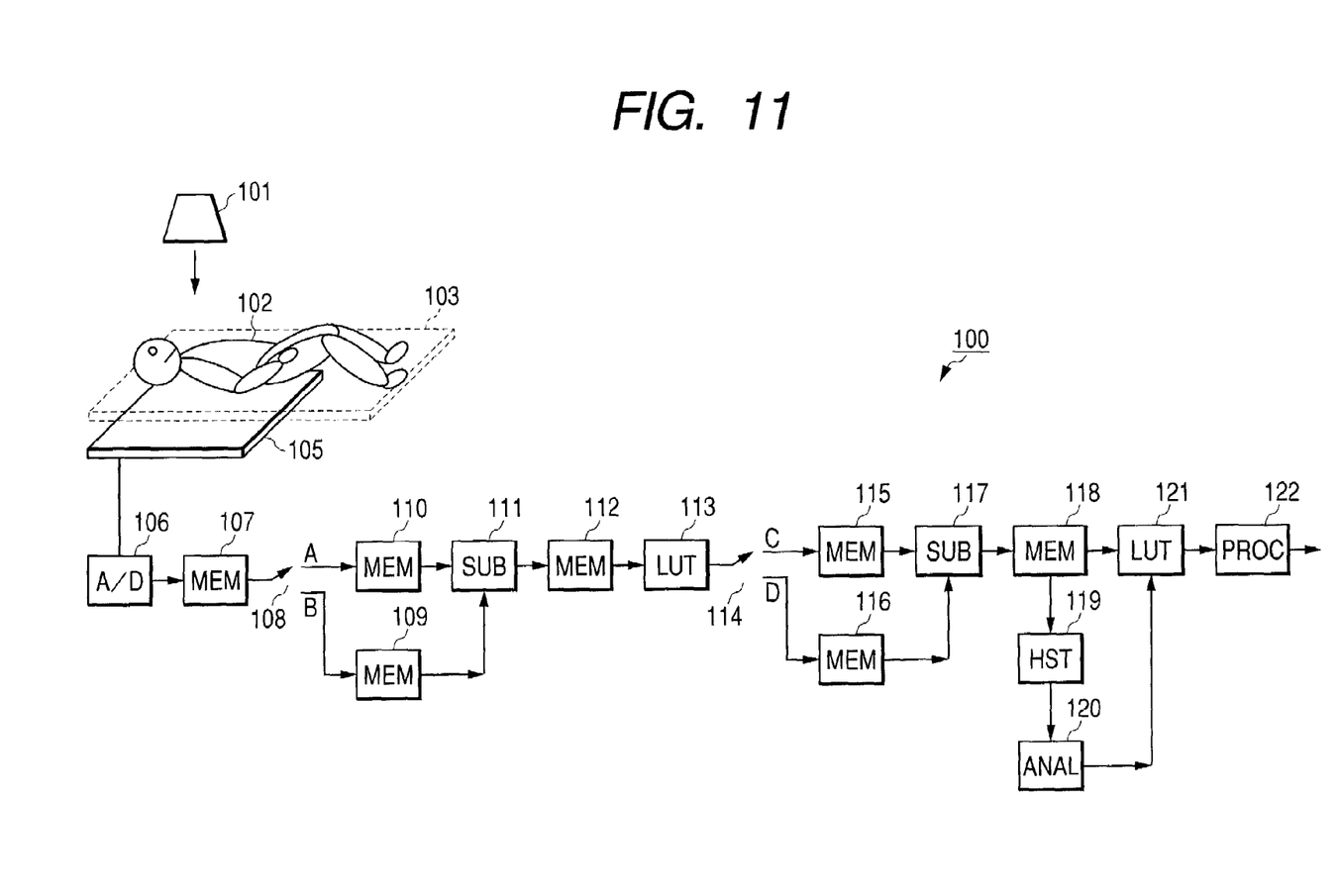
FIG. 11 is a block diagram showing the arrangement of an X-raying apparatus according to the third embodiment.

For this purpose, as shown in FIG. 11, an X-raying apparatus 100 in the third embodiment further comprises an arithmetic block 122 on the output side of an LUT 121 in addition to the arrangement shown in FIG. 1.

Figure 12:
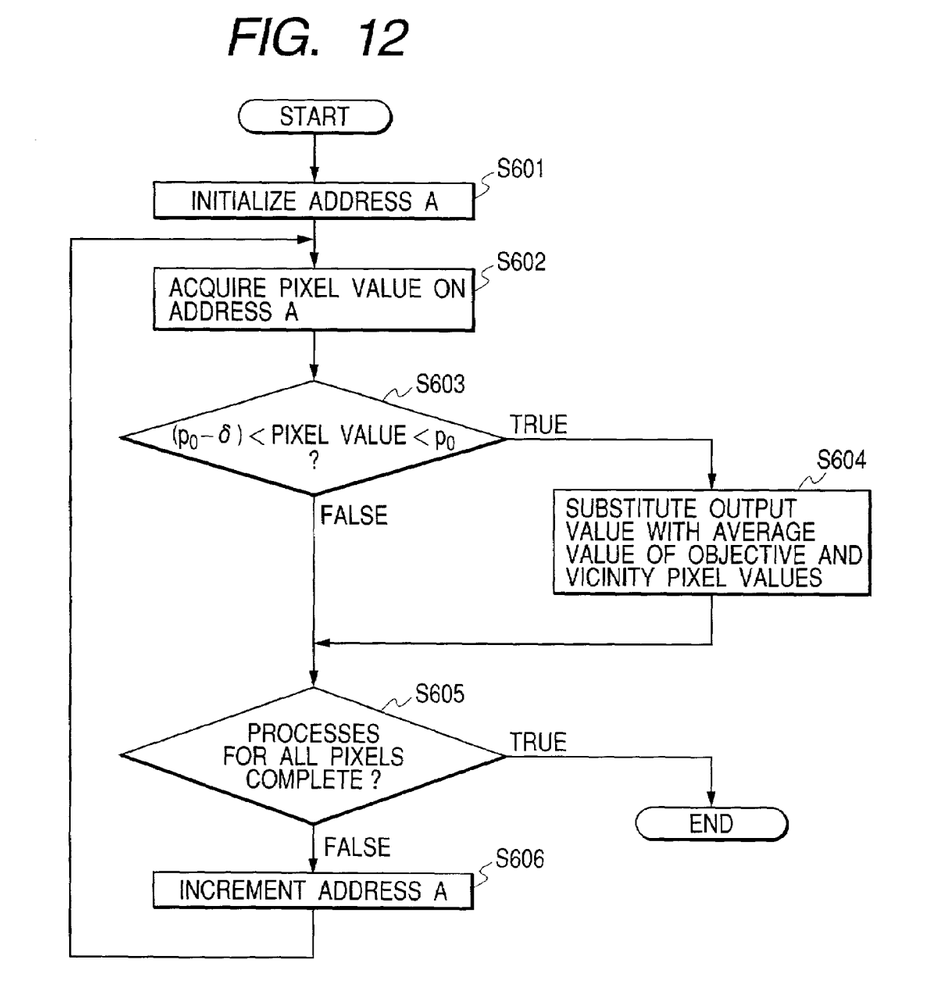
FIG. 12 is a flowchart for explaining processing of an arithmetic block 122 in the X-raying apparatus.

The arithmetic block 122 executes, e.g., processing shown in the flowchart of FIG. 12.

The arithmetic block 122 initializes an address A representing a pixel position on an objective image (step S601). The arithmetic block 122 acquires a pixel value at the address A from the output of the LUT 121 (step S602).

The arithmetic block 122 checks whether the pixel value (objective pixel value) acquired in step S602 falls within the curved portion (nonlinear portion) of the LUT 121 shown in FIG. 10, i.e., the range of (p0-δ) to p0 (step S603).

If TRUE in step S603, the arithmetic block 122 substitutes the output value with the average value of nine pixels including objective and vicinity pixels (step S604). After that, the arithmetic block 122 advances to processing in the next step S605.

If FALSE in step S603, the arithmetic block 122 directly shifts to processing in the next step S605.

In step S605, the arithmetic block 122 checks whether processes in steps S602 to S604 are complete for all the pixels which form the objective image (step S605). If TRUE in step S605, the arithmetic block 122 ends the processing.

If FALSE in step S605, the arithmetic block 122 increments the address A in order to execute processing for the next pixel (step S606). Then, the arithmetic block 122 executes processing from step S602 again.

As described above, in the third embodiment an average of pixel values around an objective pixel is obtained when an output pixel value exists on the curved portion of the LUT 121. This can reduce noise information remaining in a direct ray region, and can realize more natural clipping.

[Fourth Embodiment]

Figure 13:
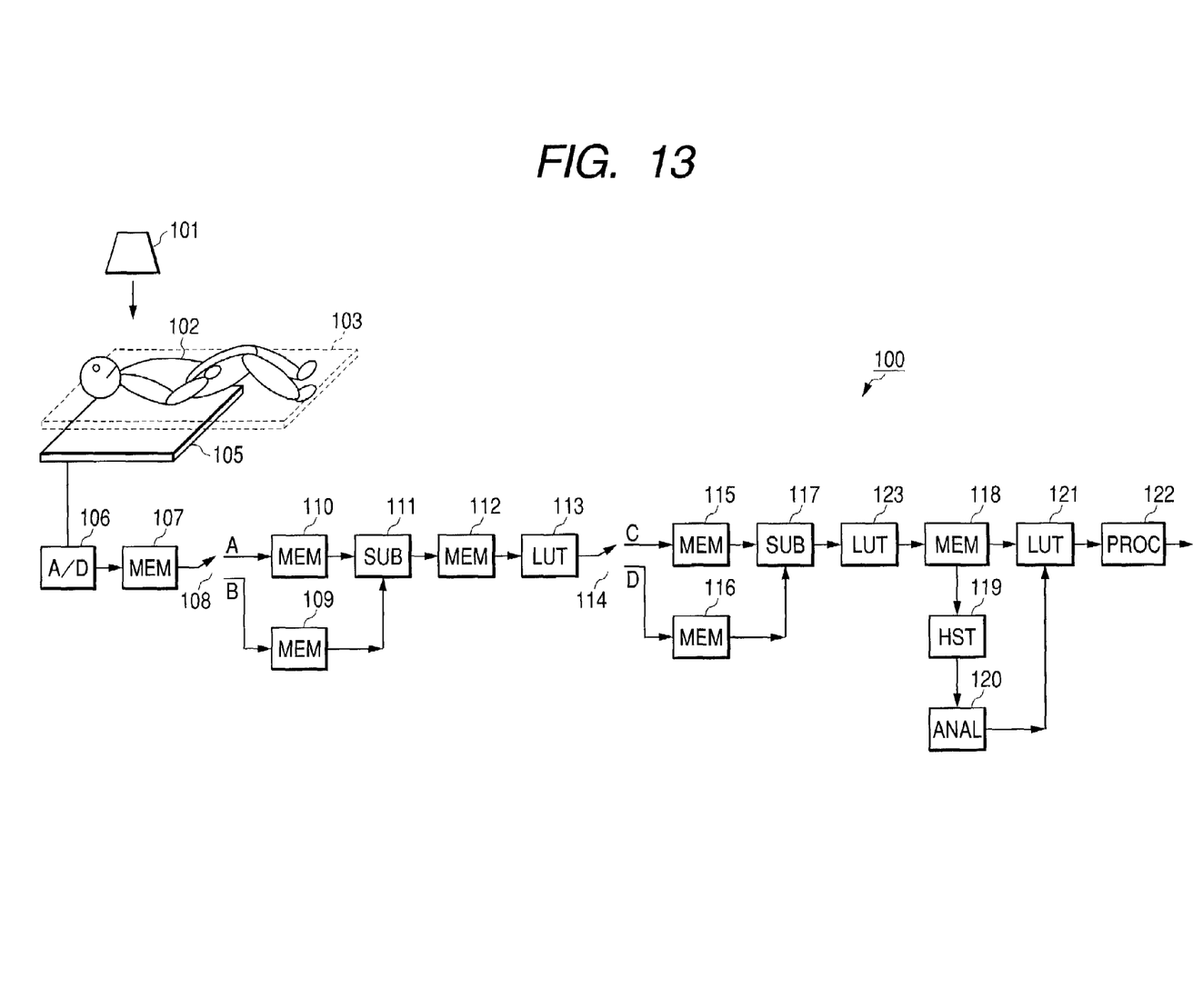
FIG. 13 is a block diagram showing the arrangement of an X-raying apparatus according to the fourth embodiment.

In the fourth embodiment, the X-raying apparatus 100 shown in FIG. 11 further comprises an LUT 123, as shown in FIG. 13.

The LUT 123 receives an output from a difference block 117, and sends an output to a memory 118. The LUT 123 is a lookup table particularly to obtain a display image suitable for image diagnosis.

Processing of removing noise of the above-mentioned direct ray region is executed after the LUT 123 converts image data output from the difference block 117 into a display image.

A pixel value output from the LUT 123 depends on a display (not shown). The arrangement of the fourth embodiment is effective when an output image from the X-raying apparatus 100 has already been converted into a display image.

In the first to fourth embodiments, the objective region is a direct ray region, i.e., a region (through region) where X-rays directly enter an image sensor. The objective region is not limited to this, and may be the background of a general radiograph (e.g., region outside a radiation-irradiated field). In this case, the result of detecting the pixel value range of the background by the above-described heel point detection is also effective not only for LUT creation but also for image processing of extracting or deleting only the background.

Image processing including emphasis processing such as dynamic range compression may be executed after the direct ray region is fixed (clipped). This can provide a stably-processed image without emphasizing correction noise.

Note that the present invention may be applied to either a system constituted by a plurality of apparatuses (e.g., image processing apparatuses, interfaces, radiographic apparatuses, X-ray generation apparatuses, and the like) or an arrangement that integrates an image processing apparatus and a radiographic apparatus, or the like.

The objects of the present invention are also achieved when a storage medium which stores software program codes for realizing the functions of the first to fourth embodiments is supplied to a system or apparatus and the computer (or the CPU or MPU) of the system or apparatus reads out and executes the program codes stored in the storage medium.

In this case, the program codes read out from the storage medium realize the functions of the first to fourth embodiments. The storage medium which stores the program codes constitutes the present invention.

The storage medium for supplying the program codes includes a ROM, floppy disk, hard disk, optical disk, magnetooptical disk, CD-ROM, CD-R, magnetic tape, and nonvolatile memory card.

The functions of the first to fourth embodiments are realized when the computer executes the readout program codes. Moreover, the present invention is constituted when an OS running on the computer performs part or all of actual processing on the basis of the instructions of the program codes and this processing realizes the functions of the first to fourth embodiments.

The present invention is also constituted when the program codes read out from the storage medium are written in the memory of a function expansion board inserted into the computer or the memory of a function expansion unit connected to the computer, the CPU of the function expansion board or function expansion unit performs part or all of actual processing on the basis of the instructions of the program codes, and this processing realizes the functions of the first to fourth embodiments.

In a case where the present invention is applied to the aforesaid computer-readable storage medium, the storage medium stores, for example, program codes corresponding to the flowcharts shown in FIGS. 2, 3 and 12 described in the above embodiments.

Figure 14:
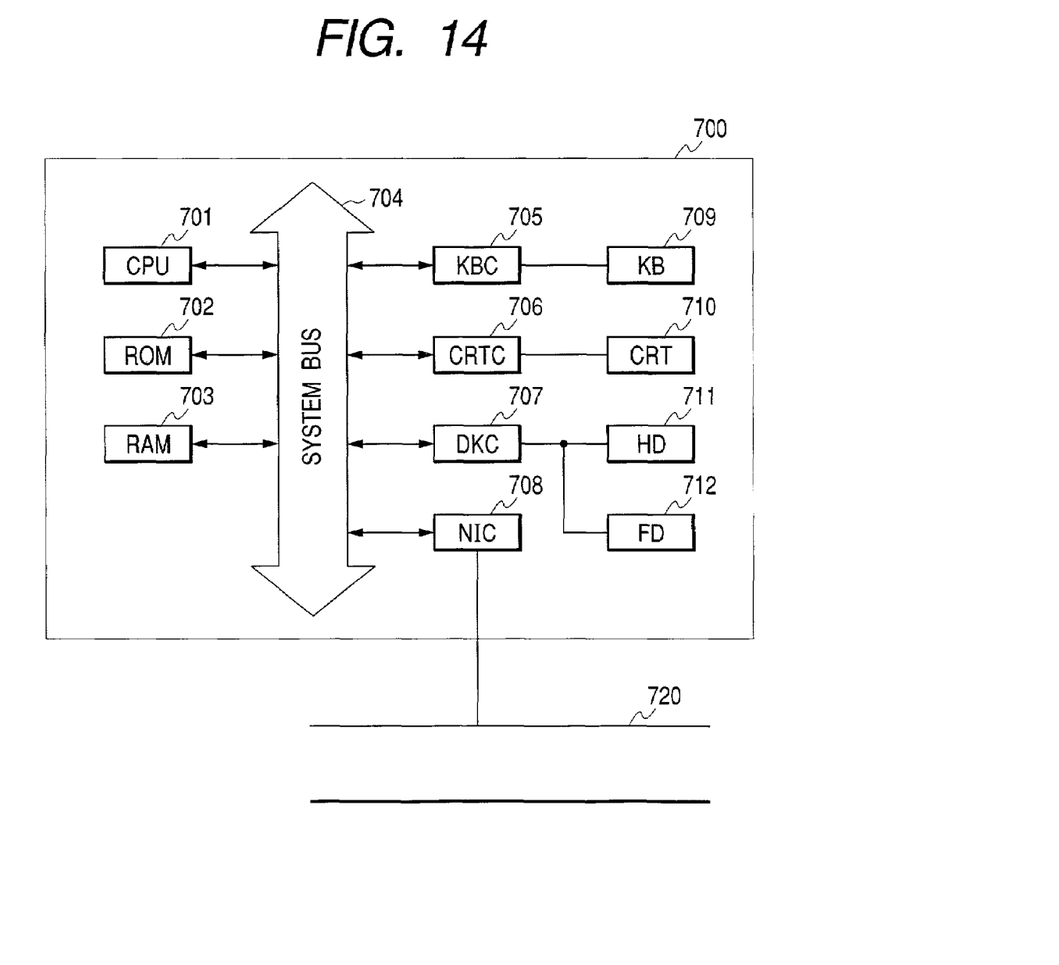
FIG. 14 is a block diagram showing the arrangement of a computer which can execute a program concerning a function or processing in the first to fourth embodiments.

FIG. 14 shows an arrangement of a computer function 700. As shown in FIG. 14, the computer function 700 is constituted by communicably connecting via a system bus 704 a CPU 701, a ROM 702, a RAM 703, a keyboard controller (KBC) 705 for a keyboard (KB) 709, a CRT controller (CRTC) 706 for a CRT display (CRT) 710 serving as a display, a disk controller (DKC) 707 for a hard disk (HD) 711 and floppy disk (FD) 712, and a network interface card (NIC) 708 connected to an arbitrary network 720.

The CPU 701 controls all the building components connected to the system bus 704 by executing software stored in the ROM 702 or HD 711 or software supplied from the FD 712.

That is, the CPU 701 performs control for realizing operations in the first to fourth embodiments by reading out a processing program complying with a predetermined processing sequence from the ROM 702, HD 711, or FD 712 and executing the readout program.

The RAM 703 functions as the main memory or work area of the CPU 701.

The KBC 705 controls an instruction input from the KB 709 or a pointing device (not shown).

The CRTC 706 controls display on the CRT 710.

The DKC 707 controls access to the HD 711 or FD 712 which stores boot programs, various application software programs, editing files, user files, network management programs, and processing programs according to the first to fourth embodiments.

The NIC 708 bidirectionally exchanges data with an apparatus or system on the network 720.

As described above, according to the embodiments, the histogram of an objective image (e.g., radiograph) is created. The start point (boundary point) of a predetermined region (e.g., direct ray region where radiation directly enters an image sensor without the mediacy of an object) on the histogram is obtained by bended line fitting.

Accordingly, the predetermined region can be extracted based on the start point. Further, the predetermined region on the objective image can be accurately extracted. Noise information caused by image correction processing concerning characteristic variations between the pixels of the image sensor can be properly suppressed, providing a high-quality processed image. For example when the pixel value of a predetermined region such as a direct ray region or background (e.g., region outside the radiation-irradiated field) on a radiograph is substantially fixed to a predetermined value, noise within the predetermined region can be removed or suppressed.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   a histogram creation unit for creating a pixel value histogram of an objective image; and
   an extraction unit for extracting a pixel value at a boundary between a predetermined region and another region of the objective image by approximating by a bended line formed from two straight lines a predetermined range of the histogram created by said histogram creation unit.

2. An apparatus according to claim 1, wherein the objective image includes a radiograph of an object, and the predetermined region includes a radiation through region or a region outside a radiation irradiation field.

3. An apparatus according to claim 1, wherein said extraction unit extracts a heel point of the bended line obtained by the approximation as the boundary pixel value.

4. An apparatus according to claim 1, wherein said extraction unit includes a setting unit for setting the predetermined range.

5. An apparatus according to claim 1, wherein said extraction unit includes a change unit for changing the predetermined range.

6. An apparatus according to claim 1, wherein said extraction unit extracts the boundary pixel value when the bended line obtained by the approximation satisfies a predetermined condition.

7. An apparatus according to claim 6, wherein the predetermined condition includes a condition that a ratio of errors of results of fitting using the bended line formed from the two straight lines is not more than a predetermined value and that change rates of slopes of the two straight lines are not less than a predetermined value.

8. An apparatus according to claim 6, wherein the predetermined condition concerns at least one of an approximate degree of the bended line and the slopes of the two straight lines.

9. An apparatus according to claim 8, wherein the predetermined condition concerning the approximate degree concerns variations in data of the histogram from the bended line.

10. An apparatus according to claim 8, wherein the predetermined condition concerning the slopes concerns changes in the slopes of the two straight lines.

11. An apparatus according to claim 1, further comprising:
    a transform unit for transforming a pixel value in the predetermined region into a predetermined value.

12. An apparatus according to claim 11, wherein said transform unit transforms the pixel value in accordance with a continuous, differentiable transform function.

13. An apparatus according to claim 12, wherein the transform function substantially transforms a pixel value in the predetermined region into a predetermined value, substantially linearly transforms a pixel value in an other region, and nonlinearly transforms a pixel value near the boundary pixel value.

14. An apparatus according to claim 13, further comprising:
    a smoothing unit for smoothing a value of a pixel nonlinearly transformed by the transform function in accordance with the value of the pixel and values of pixels around the pixel.

15. An apparatus according to claim 1, further comprising:
    a display transform unit for performing pixel value transform depending on a display for the objective image before processing of said extraction unit.

16. An apparatus according to claim 11, further comprising:
   an emphasis unit for performing predetermined emphasis processing for an image processed by said transform unit.

17. An apparatus according to claim 16, wherein the predetermined emphasis processing includes processing of changing a dynamic range of an image.

18. An apparatus according to claim 1, further comprising:
   a recognition unit for recognizing the predetermined region on the basis of the boundary pixel value.

19. An image processing system constituted by a plurality of apparatuses communicatably connected to each other, wherein said system comprises said respective units of said image processing apparatus defined in any one of claims 1 to 18.

20. An image processing method comprising steps of:
   creating a pixel value histogram of an objective image; and
   extracting a pixel value at a boundary between a predetermined region and another region of the objective image by approximating by a bended line formed from two straight lines a predetermined range of the histogram created in the step of creating the histogram.

21. A computer-readable storage medium, wherein said storage medium stores a program for causing a computer to realize respective functions of said image processing apparatus defined in any one of claims 1 to 18.

22. A computer-readable storage medium, wherein said storage medium stores a program for causing a computer to realize respective functions of said image processing system defined in claim 19.

23. A computer-readable storage medium, wherein said storage medium stores a program for causing a computer to perform respective operations of the image processing method defined in claim 20.

* * * * *